July 28, 1936.  R. T. SMITH  2,048,956
FILTER AND LIQUID AND GAS SEPARATOR
Filed April 23, 1934
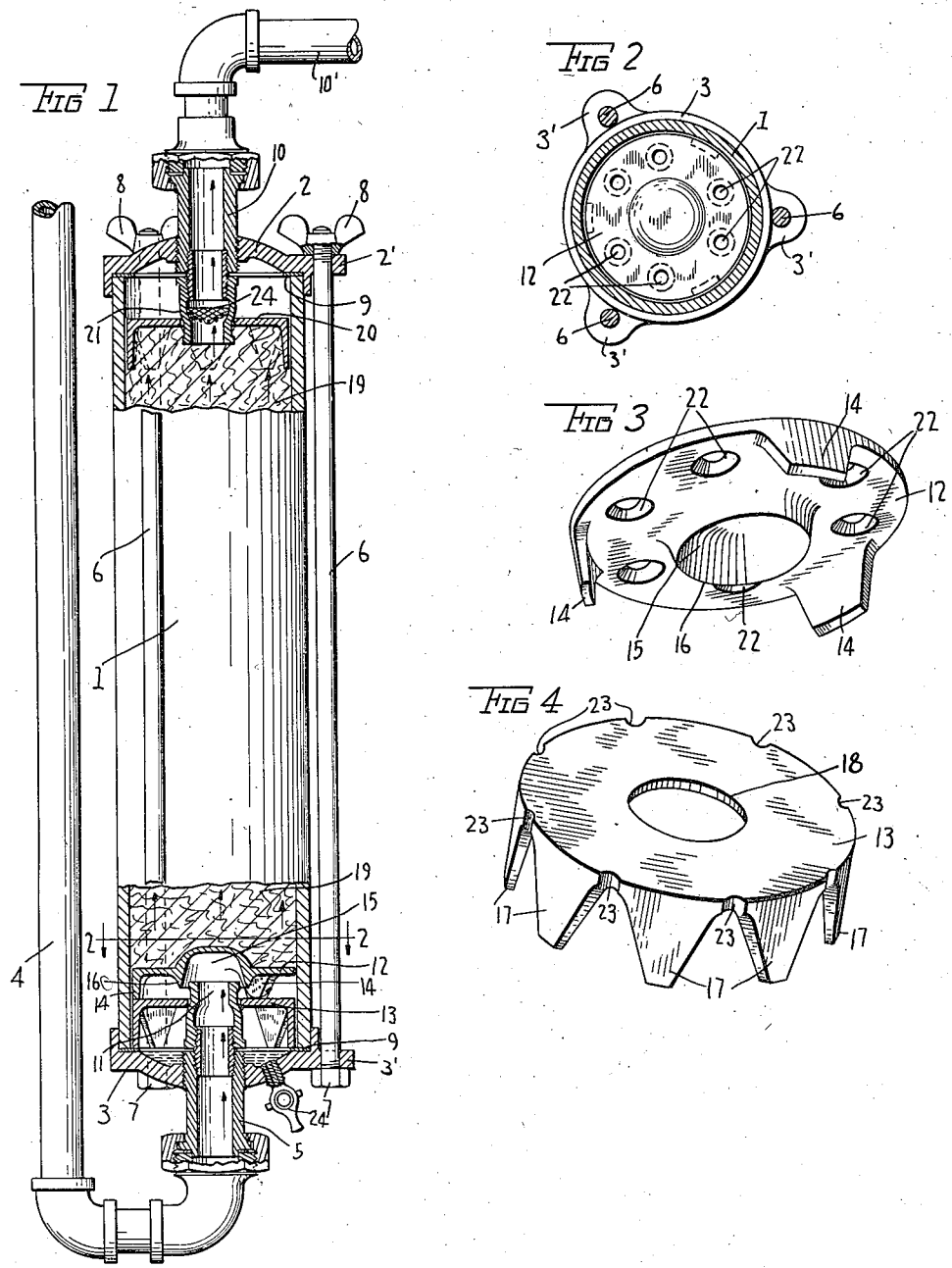
INVENTOR.
Ray T. Smith
BY
Staley & Welch
ATTORNEYS.

Patented July 28, 1936

2,048,956

UNITED STATES PATENT OFFICE 2,048,956

FILTER AND LIQUID AND GAS SEPARATOR

Ray T. Smith, Piqua, Ohio

Application April 23, 1934, Serial No. 721,892

2 Claims. (Cl. 183—48)

This invention relates to improvements in liquid and gas separating devices, it more particularly relating to that class in which a liquid such as water is separated from compressed air by deflection, baffling and filtering, the invention particularly relating to the form and disposition of the deflector and baffle members and the character of the filtering medium employed in connection therewith.

The device is especially advantageous in use with paint spraying operations where the spraying medium is compressed air, for in such operations the presence of water carried in the air stream with the paint or enamel spoils the appearance of the work, and all such water or other detrimental fluids should be separated out before the air engages the paint.

Although it is true that in practically all primary sources of compressed air efforts are made to trap out and collect liquids such as water, which traps are of comparatively large capacity, still there is frequently some small quantity of water vapor carried over into the main conduit beyond the primary trap, where condensation takes place, and since this water finds its way into the spraying devices, the work is spoiled by its presence and mixing with the paint.

It is an object of this invention to provide a smaller, inexpensive liquid separation device which is to be placed in the air conduit lines in comparatively close proximity to the connection to the spraying device so that the air receives a final treatment to remove any water before the air engages the paint.

Another object is to provide a filter which will absorb moisture and remove from the air any dust or other foreign matter that might be detrimental to any operation for which the air is employed, and of a character which will absorb any moisture in the air which has escaped the deflecting devices.

Another object is to provide a filter which is easily cleaned.

Other objects and advantages will appear from the following specifications, claims and drawing.

In the accompanying drawing:

Fig. 1 is a view partly in elevation and partly in vertical section of an improved filter of the type mentioned.

Fig. 2 is a transverse section on the line 2—2 of Fig. 1, with the interior packing removed.

Fig. 3 is an enlarged perspective view of a detail.

Fig. 4 is an enlarged perspective view of a detail.

Referring to the drawing, the filter consists of a tubular open-ended cylindrical casing 1, an upper head 2 and a lower head 3. Air under pressure is conducted through the conduit 4 to the interior of the casing, passing through the fitting 5 which is screwed into the lower head 3. These heads 2 and 3 are secured against the open ends of the casing 1 by the tie rods 6, having heads 7 and wing nuts 8. The tie rods are inserted in openings in the ears 2' and 3' on the heads 2 and 3 respectively. Gaskets 9 are employed interposed between the ends of the body and the respective heads to provide airtight joints when the wing nuts are tightened up on the tie rods. In the upper head is screwed a fitting 10 and conduit 10' through which the air passes out from the filter to the device which is to use the air.

If a flow of air were permitted to pass through the lower fitting 5 directly into the interior of the casing no separation of entrained water from the air would be made. To provide for water separation, the entering air stream is turned back on itself as soon as the air issued from the upper end 11 of the lower fitting. This doubling back on itself is accomplished by means of a deflector plate 12 shown in detail in Fig. 3 which view is a perspective view of the plate as viewed from below, and the air is caused to impinge angularly on a second lower baffle plate 13 positioned below the plate 12.

The deflector plate 12 is a circular member slightly less in external diameter than the internal diameter of the casing 1 in which it is placed, and has a plurality of legs 14. In the central portion of the under side of the plate is a concave depression 15 which when in place forms an inverted cup directly over the upper end 11 of the fitting 5, the effective depth of the cup being increased by the addition of an annular depending rim 16 extending below the lower surface of the plate.

The lower baffle plate 13 is also a circular member of approximately the same dimensions as the plate 12, and like that plate, has a plurality of legs 17 which in the present showing are longer and greater in number. The baffle plate 13 rests on the lower head 3 and supports the plate 12, the latter member resting on the upper surface of the baffle plate, as seen in Fig. 1. A central opening 18 in the baffle plate 13 permits the proper positioning of both the plates in correct relation with the nozzle 11, as also seen in Fig. 1, whereby a space is left between the upper end of the nozzle and the lower inner surface of the inverted cup or depression 15.

In practice the plates are retained in the position shown in Fig. 1 by reason of the fibrous absorbent packing 19 with which the interior of the casing is filled, and as mentioned no packing is shown in the sectional view, Fig. 2, to avoid obscuring the view. When the air is admitted into the casing through the lower fitting 5, the pressure of the air against the baffle plate 12 would lift this member, but on account of the packing cannot do so. For convenience in assembling, a plate 20 is also used at the upper end of the mass of packing. The upper plate 20 merely prevents the packing from protruding out of the upper end of the casing 1 when the filter is disassembled, and any suitable plate may be used. However, in the present case, the upper plate 20 is a duplicate of the plate 13, and is prevented from rising because the central opening therein is sufficiently small that it will not pass above the enlarged portion 21 of the lower end of the upper fitting 10. Enough packing is employed so that in placing the upper head 2 on the body in assembly, a considerable pressure by the compressed packing is exerted against the plate 12 to prevent its lifting under the effect of the air pressure.

Fibrous packing is employed of a character to absorb any moisture not removed by the baffle. Excelsior is preferably used and it is a material highly effective to absorb and remove moisture from air.

The operation is as follows: The air in flowing upwardly through the lower nozzle is turned back and directed downwardly and outwardly, as stated, by reason of the inverted cup or depression 15 and issues from between the annular rim and the outer surface of the nozzle in the form of a hollow cone, as shown by the arrow in Fig. 1. The air on striking the flat upper surface of the lower baffle plate 13 angularly as it does, tends to separate the water from the air, because the water being heavier than the air tends to spread outwardly and radially over the flat surface of the baffle plate and is not again picked up by the air; that is, the air immediately rebounds on striking the baffle plate and escapes upwardly through the plurality of openings 22 in the deflector plate and also by the edge of this plate, whereas the water is swept toward the edge of the baffle plate and drains over the edge through the several small notches 23 in the edge (Fig. 4) collecting in the chamber formed by the concaved lower head 3, as shown in Fig. 1.

The construction is such that while there is pressure on the water resting in the lower head, the air flow does not reach this water to churn it up to cause the water to again be caught up by the air stream. The water thus collects in a quiet zone beneath the baffle. Any water collecting in the lower head as shown in Fig. 1 is readily drained off by opening the pet cock 24.

The packing 19 also acts to filter out any dust or other foreign particles, and the filter is easily cleaned by disassembling the heads from the casing and removing the packing from the casing. A wire mesh screen 24 is preferably employed in the air outlet pipe fitting 10 to prevent particles of the packing of filtering material entering the outlet pipe.

Having thus described my invention, I claim:

1. In a separator for gas and liquid, a casing, an air inlet pipe extending into the lower end of said casing, and an air outlet pipe connected with the upper end of said casing, a baffle plate in said casing having a flat imperforate baffling surface and having legs resting on the upper surface of the bottom of said casing, said plate having an opening therein to permit the air inlet pipe to extend therethrough, a deflector plate having legs and an imperforate central portion and an annular row of perforations between said central imperforate portion and the edges of said deflector plate, absorbent filtering material in said casing above said deflector plate, said deflector plate resting on the said baffle plate and arranged over the discharge end of said air inlet pipe in said casing, said casing having a liquid receiving space below said baffle plate, and means to draw liquid collected in said space.

2. In a separator for gas and liquid, a cylindrical casing, an air pipe extending into the lower end of said casing, an air outlet pipe leading from the upper end of said casing, a removable baffle plate of substantially the same diameter as the interior of said casing located in the lower end thereof having an aperture to receive said air inlet pipe, said baffle plate having a plurality of supporting legs resting upon the bottom of said casing and also having its edge provided with a plurality of notches, there being a chamber in said casing beneath said baffle plate, means for draining liquid from said chamber, a deflector plate having a plurality of legs to removably support said deflector plate upon the top of said baffle plate, said deflector plate having a dome-shaped portion arranged immediately above the upper end of said air inlet pipe and also having a plurality of apertures, said deflector plate being of substantially the same diameter as the interior diameter of said casing, and an absorbent filtering medium in said casing between said deflector plate and said air discharge pipe.

RAY T. SMITH.